March 18, 1952  C. A. RATKOVIAK  2,589,731
FUSE TYPE HYDRAULIC VALVE
Filed Oct. 2, 1945  2 SHEETS—SHEET 1
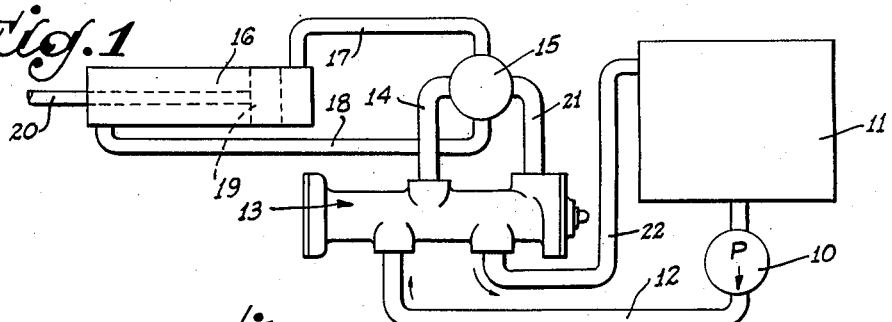
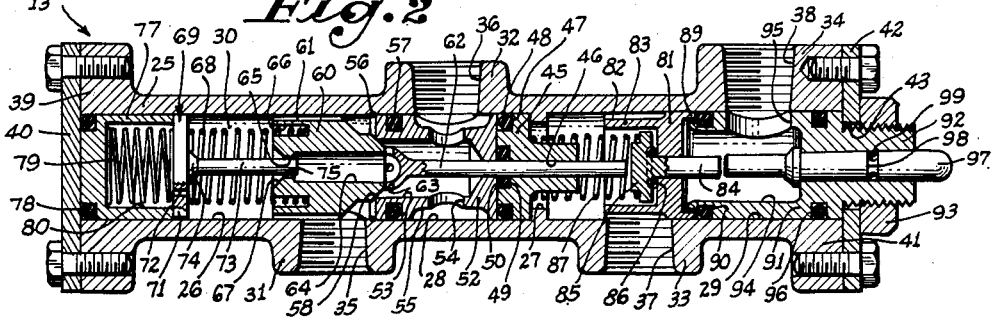
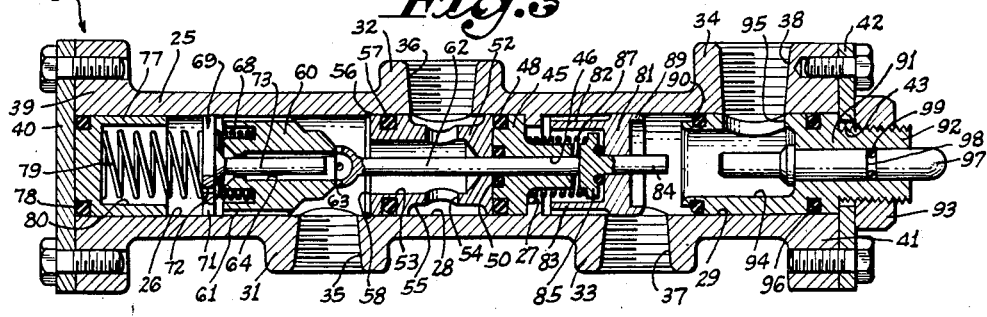
INVENTOR
CASIMER A. RATKOVIAK
BY
HARRIS, KIECH, FOSTER & HARRIS
FOR THE FIRM
ATTORNEYS March 18, 1952  C. A. RATKOVIAK  2,589,731
FUSE TYPE HYDRAULIC VALVE
Filed Oct. 2, 1945  2 SHEETS—SHEET 2
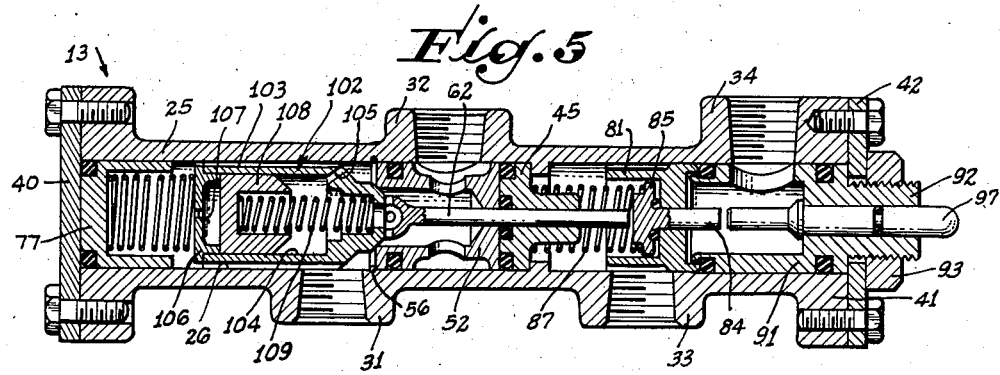
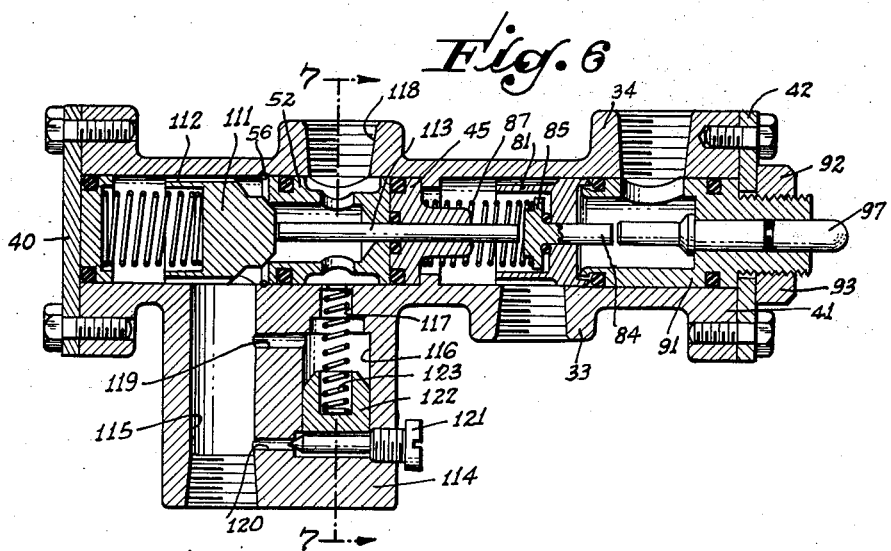
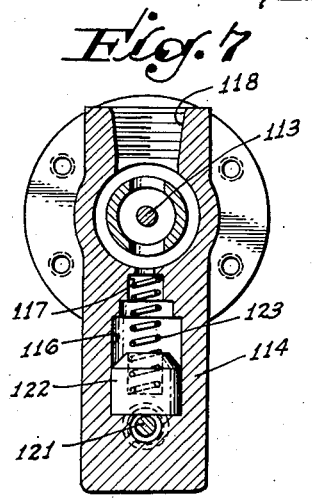
INVENTOR
CASIMER A. RATKOVIAK
BY HARRIS, KIECH, FOSTER & HARRIS.
FOR THE FIRM
ATTORNEYS Patented Mar. 18, 1952

2,589,731

UNITED STATES PATENT OFFICE 2,589,731

FUSE TYPE HYDRAULIC VALVE

Casimer A. Ratkoviak, Pasadena, Calif., assignor to Howard Field, Jr., Los Angeles, Calif.

Application October 2, 1945, Serial No. 619,847

24 Claims. (Cl. 137—153)

This invention relates to hydraulic valves and, more particularly, to a hydraulic safety valve adapted to pass a flow of operating fluid therethrough only so long as the fluid supply lines connected thereto are not broken or damaged.

The invention is of particular utility when employed in connection with an aircraft hydraulic system and, consequently, will be described as employed therein. It is to be understood, however, that the invention has other uses and I do not desire to be limited to the particular application described herein.

In modern aircraft it is a standard practice to employ a hydraulic system to actuate retractable landing gear, bomb-bay doors, wing flaps, and other power-operated equipment of the aircraft. Such a system normally includes a hydraulic cylinder having a piston mechanically connected to the aircraft equipment to be actuated, the ends of the cylinder being connected by suitable fluid lines through a four-way valve, commonly referred to as a selector valve, to a fluid pump adapted to deliver operating fluid, such as oil, under high pressure to one of the lines leading from the selector valve. The other line leading from the selector valve is normally connected to a fluid reservoir which supplies the pump. Obviously, by adjustment of the selector valve high pressure operating fluid may be conducted alternatively to either end of the hydraulic cylinder to actuate the piston therein, the other end of the cylinder communicating with the reservoir, which is normally maintained at relatively low pressure.

In combat aircraft employing such a hydraulic system, breakage of either of the fluid lines connected to the hydraulic cylinder, resulting from enemy action or otherwise, may permit the operating fluid in the system to bleed therefrom and be lost. This may render the entire hydraulic system inoperative, which is extremely hazardous to the aircraft and its occupants. To prevent such loss of fluid in the event of damage to such a fluid line, various expedients have been attempted, and it is now standard practice to employ an automatic valve, referred to as a fuse valve, in the fluid lines leading to each piece of hydraulic equipment, which fuse valve will automatically stop the flow to such piece of equipment in the event of damage to the fluid lines connected thereto. Such a fuse valve is illustrated and described in the application of Robert B. Sprague and Searle G. Nevius, for Automatic Hydraulic Pressure Valve, Serial No. 478,102, filed March 5, 1943, upon which my present invention is an improvement.

Such prior fuse valves, as illustrated in said Sprague et al. application, are complicated and expensive to manufacture and assemble, and it is therefore an object of the present invention to provide a fuse valve which is simple and economical.

Such prior fuse valves normally include a relatively large cylinder having a relatively large piston therein, to provide an initial displacement of operating fluid through the fluid lines connected to the hydraulic actuating cylinder, and it is a further object of my present invention to avoid the use of such a large cylinder and piston. I prefer to accomplish this by providing a free, but metered, flow of operating fluid through the valve for a time period sufficient to open the main valve of the fuse valve if the fluid lines are sound, the metered flow being stopped at the end of such period so as to prevent further flow of operating fluid through the lines in the event any line is damaged.

A further object of the invention is to provide in such a fuse valve simple means for manually resetting the fluid-metering mechanism of the fuse valve and for manually opening the main valve thereof as desired.

Other objects and advantages will be apparent from the following specification and the drawings, which are for illustrative purposes only, and in which:

Fig. 1 is a schematic flow diagram of a hydraulic system including the present invention;

Fig. 2 is a longitudinal sectional view of the preferred embodiment of the fuse valve of my present invention;

Fig. 3 is a view similar to Fig. 2, but showing an alternative operational position of the valve parts;

Fig. 4 is a fragmentary view similar to the left-hand end of Fig. 2, but showing still another alternative operational position of the valve parts;

Fig. 5 is a longitudinal sectional view of an alternative embodiment of the invention;

Fig. 6 is a longitudinal sectional view of still another embodiment of the invention; and Fig. 7 is a cross-sectional view taken on the line 7—7 of Fig. 6.

Referring to the drawings, Fig. 1 shows a schematic diagram of a hydraulic system for an aircraft, including a high pressure fluid pump 10 adapted to pump an operating fluid, such as, for example, oil, from a reservoir 11 and to deliver such oil at relatively high pressure through a fluid line 12 to a fuse valve 13, the fuse valve comprising the essence of the present invention.

Such operating fluid flows from the fuse valve 13 through a fluid line 14 to a selector valve 15, of the four-way type, which is adapted to direct the flow of high pressure operating fluid to either end of a hydraulic cylinder 16 through fluid lines 17 or 18. As is customary in the art, the hydraulic cylinder 16 is provided with a piston 19 to which is mechanically connected a piston rod 20 which extends out of the cylinder and is adapted to be connected to a device to be actuated. Also connected to the selector valve is a return fluid line 21 which is connected to the fuse valve 13, being adapted to convey fluid from the hydraulic cylinder 16 at low pressure through the fuse valve 13 to a return line 22, which in turn is connected to the reservoir 11. As will be apparent, the reservoir 11 is maintained at relatively low pressure. As also will be apparent, the fluid lines 12 and 14 always convey operating fluid under high pressure, and the return lines 21 and 22 always convey spent operating fluid at relatively low pressure. Suitable adjustment of the selector valve 15, obviously, controls actuation of the hydraulic cylinder 16.

The fuse valve 13, as best shown in Fig. 2, includes a valve housing 25 having a longitudinal bore 26 which is divided by an annular shoulder 27 into an inlet portion 28 and an outlet portion 29. Provided on the valve housing 25 are bosses 31, 32, 33, and 34 which, respectively, are provided with a primary inlet port 35, a primary outlet port 36, a secondary outlet port 37, and a secondary inlet port 38, all of such ports being suitably threaded to receive the ends of the fluid lines 12, 14, 22, and 21, respectively. The valve housing 25 is also provided with an end flange 39 to which is removably secured an end plate 40 adapted to close the leftward end of the longitudinal bore 26, as seen in Fig. 2. On the other end of the valve housing 25 is provided a similar end flange 41, which is preferably made integral with the boss 34 and has attached thereto an end plate 42, the end plate 42 being provided with a central aperture 43.

Disposed in the longitudinal bore 26, and abutting against the annular shoulder 27 is an annular separating element 45, having an axial bore 46 therein and provided with a peripheral groove 47 carrying an annular sealing element 48, preferably of rubber or other resilient material, such as, for example, a standard O-ring, adapted to form a fluid-tight seal between the separating element and the bore 26. Also provided in the separating element 45 is a central circular recess 49 which likewise contains an annular sealing element 50 which is similar to the sealing element 48 but smaller in diameter.

Also disposed in the inlet portion 28 of the longitudinal bore 26 is a main valve seat member 52 provided with a central chamber 53 which is in open communication through radial ports 54 and an external annular recess 55 with the primary outlet port 36. The main valve seat member 52 abuts against one end of the separating element 45 and is retained in such position in the longitudinal bore 26 by a suitable snap ring 56, and is also provided with an external groove containing an annular sealing element 57, similar to the sealing element 48, which forms a fluid-tight seal between the leftward end of the valve seat member, as seen in Fig. 2, and the inlet portion 28 of the longitudinal bore 26. The inner annular edge 58 of the valve seat member 52 provides a main valve seat of the invention.

Adapted to seat on the main valve seat member 52 is a main valve member 60 which is slidably carried in the inlet portion 28 of the longitudinal bore 26. The main valve member 60 is provided with longitudinal peripheral grooves 61, circumferentially spaced about the periphery of the valve member, so as to provide free fluid communication between the primary inlet port 35 and the outer end of the valve member. The main valve member 60 is also provided with a valve stem 62 which extends through the central chamber 53 of the valve seat member 52 and also through the axial bore 46 of the separating element 45, the base of the valve stem being provided with a plurality of radial ports 63 which communicate between the central chamber 53 and a longitudinal passage 64 formed in the main valve member. Although the valve stem 62 is shown as a part of the main valve member 60, obviously it may be made as a separate part without departing from the invention. As will be noted, the outer end of the longitudinal passage 64 is provided with an inwardly projecting annular shoulder 65, and the outer end face of the valve member is provided with an annular recess 66 and is provided with a conical auxiliary valve seat 67. Received in the annular recess 66 is one end of a compression spring 68, the other end of which engages the inner end face of an auxiliary valve member 69. The main valve member 60 and the auxiliary valve member 69 define a chamber 30 therebetween.

The auxiliary valve member 69 includes a circular piston member 71 which makes a close sliding fit with the inlet portion 28 of the longitudinal bore 26, and is provided with a restricted orifice 72 communicating between opposite sides thereof. The auxiliary valve member 69 also includes a valve stem 73 which extends into the longitudinal passage 64 of the main valve member 60 and provides only a slight clearance with the annular shoulder 65, such clearance constituting a metering orifice 75 of the invention. The valve stem 73 is connected to the piston member 71 by a conical seating face 74 adapted to seat on the conical auxiliary valve seat 67, as best illustrated in Fig. 4, to close the metering orifice 75. The compression spring 68 normally holds the auxiliary valve member 69 in the position illustrated in Fig. 2, in which it engages the inner end of a cup-shaped element 77 disposed in the longitudinal bore 26, the cup-shaped element being provided with a suitable annular groove and sealing element 78, which is similar to the annular sealing element 48 described above, and which forms a fluid-tight seal between the cup-shaped element 77 and the longitudinal bore 26 so as to prevent fluid leakage therepast. Contained in a chamber 80 defined by the cup-shaped element 77 is a compression spring 79 which normally tends to separate the cup-shaped element and the auxiliary valve member, but which is weaker than the compression spring 68 so that the auxiliary valve element normally is maintained in the position illustrated in Fig. 2.

Disposed in the outlet portion 29 of the longitudinal bore 26 is a longitudinally movable secondary valve element 81 provided on its periphery with a plurality of longitudinally extending grooves 82 which are circumferentially spaced so as to provide fluid communication between the secondary outlet port 37 and the inner end of the outlet portion 29 of the longitudinal bore 26 so as to vent fluid from the latter. The secondary valve element 81 is also provided with a central cup-shaped recess 83 into which the valve stem 62 of the main valve member 60 extends. Carried by the secondary valve element 81 is a connecting pin 84 having a head 85 thereon which is disposed in the cup-shaped recess 83, and is provided with an annular sealing element 86 substantially similar to the sealing element 50. As will also be noted, a compression spring 87 is disposed between the annular separating element 45 and the head 85 so as to normally maintain the head out of engagement with the valve stem 62, as illustrated in Fig. 2. The secondary valve element 81 is also provided with an external annular lip 89 which is adapted to engage and seat on an annular sealing element 90 carried in an end plug 91, the sealing element 90 being substantially similar to the sealing element 48, and providing a fluid-tight seal between the end plug and the annular lip when the secondary valve element 81 is seated in the position illustrated in Fig. 2. The end plug 91 is provided with a threaded projection 92 which extends through the central aperture 43 of the end plate 42 and is secured thereto by means of a suitable nut 93. The end plug 91 is also provided with a central chamber 94 which communicates through a radial port 95 with the secondary inlet port 38. Carried in the periphery of the end plug 91 is an annular sealing element 96, which is similar to the sealing element 48, and which provides a fluid-tight seal between the end plug and the outlet portion 29 of the longitudinal bore 26. Extending longitudinally through the end plug 91 is a reset pin 97 having an annular shoulder 98 formed thereon to serve as a stop and limit outward movement of the pin, the pin having an annular sealing element 99 thereon adapted to form a fluid-tight seal between the end plug 91 and the pin.

When assembled, and prior to the admission of high pressure fluid thereto, the fuse valve 13 has its parts in the relative positions illustrated in Fig. 2, in which it is ready for operation. In this position, as will be noted, the main valve member 60 is seated on the main valve seat member 52 to close direct fluid communication between the primary inlet port 35 and the primary outlet port 36. Also, in this position, the auxiliary valve member 69 is disposed so that its conical seating face 74 is out of engagement with the auxiliary valve seat 67 so as to provide restricted fluid communication through the metering orifice 75 between the primary inlet port 35 and the primary outlet port 36.

In operation, high pressure operating fluid is conveyed by the pump 10 through the fluid line 12 to the primary inlet port 35 of the fuse valve 13, from which it flows through the longitudinal peripheral grooves 61 of the main valve member 60 into the chamber 30. From the chamber 30, such operating fluid flows through the metering orifice 75, which substantially throttles its flow and creates a susbtantial pressure drop thereacross, and through the longitudinal passage 64, the radial ports 63 and 54, to the primary outlet port 36. Such fluid flow then passes through the fluid line 14 and the selector valve 15 to one side of the hydraulic cylinder 16 to actuate the piston 19 thereof. For example, if the selector valve 15 is set so as to deliver such high pressure operating fluid through the fluid line 17 to the right-hand end of the hydraulic cylinder 16, as viewed in Fig. 1, the left-hand end of the cylinder is connected through the fluid line 18 and the selector valve 15 to the return fluid line 21, so that spent operating fluid flows into the fuse valve 13 through the secondary inlet port 38 thereof.

Spent operating fluid entering the fuse valve 13 through the secondary inlet port 38 flows through the radial port 95 into the central chamber 94 of the end plug 91 and quickly builds up fluid pressure therein to a value which overcomes the relatively low force exerted by the compression spring 87, to move the secondary valve element 81 to the position illustrated in Fig. 3, in which position the secondary valve element 81 is fully opened to permit the spent operating fluid to flow directly from the chamber 94 to the secondary outlet port 37, from which it flows through the return fluid line 22 to the reservoir 11.

During the flow of high pressure operating fluid from the chamber 30 through the metering orifice 75, described above, such operating fluid also flows from the chamber through the restricted orifice 72 into the chamber 80 of the cup-shaped element 77. The longitudinal peripheral grooves 61 formed in the main valve member 60 are designed so that there is little fluid pressure drop therethrough, so that the fluid pressure in the chamber 30 is substantially as great as the fluid pressure in the primary inlet port 35, and this pressure is slowly transmitted through the restricted orifice 72 to the chamber 80 on the outer end of the auxiliary valve member 69. Since there is a substantial pressure drop across the metering orifice 75, and since the auxiliary valve stem 73 extends into the longitudinal passage 64 of the main valve member 60, the inner end of the stem is subjected to the relatively low pressure existing in the longitudinal passage 64 so that there is a pressure differential across the auxiliary valve member 69 tending to move it from the position illustrated in Fig. 2 to the position illustrated in Fig. 3. The rate of movement of the auxiliary valve member 69 between such positions is relatively slow due to the throttling effect of the restricted orifice 72. The relative sizes of the metering orifice 75 and the restricted orifice 72 are designed so that for a given fluid pressure in the chamber 30, sufficient operating fluid will be metered through the metering orifice 75 to the hydraulic cylinder 16 to cause a return flow of spent operating fluid from the cylinder sufficient to open the secondary valve element 81, as illustrated in Fig. 3, before the auxiliary valve member 69 moves beyond the position illustrated in Fig. 3, in which position the main valve member 60 has been fully opened, as described hereinafter.

Opening of the main valve member 60 is normally occasioned by movement of the secondary valve element 81 to the position illustrated in Fig. 3. This is caused by engagement of the head 85 of the connecting pin 84, which is carried with the secondary valve element 81, with the end of the valve stem 62, forcing it to the left, as seen in Fig. 2, to carry the main valve member 60 to its open position illustrated in Fig. 3. In such open position of the main valve member 60, operating fluid under high pressure may freely flow from the primary inlet port 35 through the central chamber 53 of the main valve seat member 52 and the radial ports 54 thereof directly to the primary outlet port 36, from which it may flow to the hydraulic cylinder 16 to complete the actuation of the piston 19 thereof.

In the event that any of the fluid lines 14, 17, 18, or 21 is ruptured so as to permit leakage therefrom, obviously, no spent operating fluid will return through the secondary inlet port 38 of the fuse valve to actuate the secondary valve member 81 and consequently the primary valve member 60. In such case, obviously, the primary valve member 60 will remain seated on its main valve seat member 52, as illustrated in Fig. 4, and the auxiliary valve member 69 will continue its relatively slow rightward movement to its closed position illustrated in Fig. 4, in which its seating face 74 seats in the auxiliary valve seat 67, at which time no further high pressure operating fluid can flow from the primary inlet port 35 to the primary outlet port 36. If the fuse valve 13 is omitted from the system illustrated in Fig. 1, obviously, in the event of rupture of any of the fluid lines, all of the fluid in the system may be eventually lost through leakage therefrom, which, as pointed out above, is very undesirable. The fuse valve 13, however, operates automatically in the event of such rupture to shut off the flow of high pressure operating fluid from the pump 10 to the hydraulic cylinder 16 after only sufficient fluid has been metered therethrough to normally actuate the secondary valve element 81 to open the main valve member 60. Thus, in the event of such a rupture, only a relatively small quantity of the total operating fluid in the hydraulic system will be lost.

The main valve member 60 may be opened manually by pushing the rest pin 97 inwardly, the inner end of the reset pin engaging the end of the connecting pin 84 to move the same and the valve stem 62 and the main valve member 60 from the position illustrated in Fig. 2 to that shown in Fig. 3. If the main valve member 60 and the auxiliary valve member 69 are in their closed position, as shown in Fig. 4, when the reset pin 97 is actuated, obviously both will be moved to the left, and as soon as high pressure operating fluid flows to the inner end of the valve stem 73 of the auxiliary valve member the fluid pressures thereon will be equalized so as to permit the compression spring 68 to return the auxiliary valve member to its original position shown in Fig. 2, in which it is again ready for its cycle of operation. As will be understood, normally the reset pin 97 will be actuated only to refill the fluid lines after rupture and after repair thereof, although it may be actuated in an emergency or other situation, if desired. It is an important feature of the invention. As will also be apparent, when the fluid pressures are equalized across the main valve member 60, it will be returned by the compression spring 68 to its original position shown in Fig. 2, which also resets the reset pin 97 to its normal position shown therein.

It will also be noted that the main valve member 60 and its valve seat 52 constitute an outer poppet valve and that the auxiliary valve member 69 and its valve seat 67 constitute an inner poppet valve, the outer poppet valve being normally closed and the inner poppet valve being normally open. This construction has utility other than in a fuse valve, as it may be employed to meter a predetermined quantity of fluid to a flow line, and, consequently, I do not desire to be limited to the use of such sub-combination in a fuse valve.

The alternative embodiment illustrated in Fig. 5 is identical with the construction shown in Fig. 2, except for the construction of the main and auxiliary valve members, which will be described hereinafter. In the form shown in Fig. 5, a main valve member 102 includes longitudinal, circumferentially spaced, peripheral grooves 103 and a cylindrical chamber 104, the latter being provided with a metering orifice 105. The outer end of the chamber 104 is closed by a closure cap 106 having a restricted orifice 107 therein. Disposed in the cylindrical chamber 104 is a piston valve member 108, which constitutes the auxiliary valve means of this form of the invention and which is normally retained in the position illustrated in Fig. 5 by a compression spring 109. As will be apparent, the main valve member 102 is the full functional equivalent of the main valve member 60, the piston valve member 108 is generally similar to the auxiliary valve member 69, the metering orifice 105 is generally similar to the metering orifice 75, and the restricted orifice 107 is generally similar to the restricted orifice 72. The operation of this form of the invention will be readily apparent to those skilled in the art.

The alternative embodiment illustrated in Figs. 6 and 7 is generally similar to the prior embodiments, but differs in that the auxiliary valve means is separate from the main valve means. Thus, it includes a solid main valve member 111 which is axially movable and which includes longitudinal peripheral grooves 112 similar to the grooves 61. In this form, a valve stem 113 is provided which is separate from the main valve member for obvious reasons. This form includes a relatively large boss 114 which has a primary inlet port 115 therein, and also has a cylindrical valve chamber 116 therein which communicates at its inner end through a port 117 with the main bore, which in turn communicates with a primary outlet port 118. Also formed in the boss 114 are a metering orifice 119 and a restricted orifice 120, the cross-sectional area of which is designed to be adjusted by adjustment of a needle valve element 121. Retained in the valve chamber 116 is a piston valve element 122, which constitutes the auxiliary valve means of this form of the invention, and which is generally similar in function to the piston member 108. The valve element 122 is normally retained, as shown in Fig. 6, by a relatively weak compression spring 123. As will be understood, the main valve member 111 is similar in function to the main valve member 60, the piston valve element 122 is similar in function to the auxiliary valve member 69, the metering orifice 119 is similar in function to the metering orifice 75, and the restricted orifice 120 is similar in function to the restricted orifice 72. The addition of the needle valve element 121 is an important feature of this form of the invention, as it permits adjustment of the rate of travel of the piston valve element 122 by adjusting the rate of flow of fluid thereto through the restricted orifice 120. Thus, this form of the invention may be adapted to operate in a variety of installations using a wide range of operating fluid pressures, whereas the previously described embodiments are specifically designed for use in particular hydraulic systems utilizing a predetermined operating fluid pressure. As will be apparent, the universality of application of the device shown in Fig. 6 is due to the provision of the needle valve element 121 to permit adjustment of the cross-sectional area of the restricted orifice 120.

While I have shown and described three preferred embodiments of my invention, it will be understood that certain parts and elements thereof may be replaced by other parts and elements having equivalent functions without departing from the spirit of my invention, and therefore I do not desire to be limited to the specific embodiments shown, but desire to be afforded the full scope of the following claims.

I claim as my invention:

1. In a valve device, the combination of: housing means having a primary inlet port, a primary outlet port, a secondary inlet port, a secondary outlet port, and a main fluid passage connecting said primary inlet and outlet ports; main valve means in said main fluid passage and adapted to be opened in response to a flow of fluid from said secondary inlet port to said secondary outlet port; auxiliary fluid passage means connecting said primary inlet and outlet ports; auxiliary valve means in said auxiliary passage means; spring means engaging said auxiliary valve means for normally maintaining said auxiliary valve means in open position to permit flow of fluid through said auxiliary fluid passage means; and means, including a restricted orifice communicating with said primary inlet port, for applying to said auxiliary valve means a fluid pressure which moves it toward its closed position, whereby to automatically close said auxiliary valve means after a predetermined quantity of fluid has passed therethrough.

2. In a valve device, the combination of: housing means having an inlet port and an outlet port and a main fluid passage connecting said ports; main valve means in said passage and adapted to be opened to permit a flow of fluid between said ports; auxiliary fluid passage means connecting said ports; auxiliary valve means in said auxiliary passage means; spring means engaging said auxiliary valve means for normally maintaining said auxiliary valve means in open position to permit flow of fluid through said auxiliary fluid passage means; means for automatically closing said auxiliary valve means in response to fluid pressure in said inlet port, said auxiliary valve means closing slowly to permit a substantial quantity of fluid to pass through said auxiliary fluid passage means, said means for automatically closing said auxiliary valve means including a restricted orifice communicating with said inlet port and with one side of said auxiliary valve means so as to slowly apply to said one side of said auxiliary valve means a fluid pressure sufficient to close said auxiliary valve means; and means for automatically opening said main valve means after a predetermined quantity of fluid has passed through said auxiliary fluid passage means.

3. In a valve device, the combination of: housing means having an inlet port and an outlet port and a main fluid passage connecting said ports; main valve means in said passage and adapted to be opened to permit a flow of fluid between said ports; auxiliary fluid passage means connecting said ports; a piston valve member in said auxiliary passage means and normally in a position to permit flow of fluid through said auxiliary passage means, said valve member being movable to a closed position in which it closes said auxiliary passage means; restricted orifice means communicating with said inlet port and with the outer end of said piston valve member for admitting a restricted flow of fluid from said inlet port to the outer end of said piston valve member to slowly move it to said closed position; and means responsive to the flow of a predetermined quantity of fluid through said auxiliary fluid passage means for opening said main valve means.

4. In a valve device, the combination of: housing means having an inlet port and an outlet port and a main fluid passage connecting said ports; main valve means in said passage and adapted to be opened to permit a flow of fluid between said ports; auxiliary fluid passage means connecting said ports; a piston valve member in said auxiliary passage means and normally in a position to permit flow of fluid through said auxiliary passage means, said valve member being movable to a closed position in which it closes said auxiliary passage means, said auxiliary passage means being of restricted cross-sectional area so that the fluid pressure drop through said auxiliary passage means provides a fluid pressure on the inner end of said piston valve member substantially lower than the fluid pressure in said inlet port; restricted orifice means communicating with said inlet port and the outer end of said piston valve member for admitting a restricted flow of fluid from said inlet port to the outer end of said piston valve member to slowly move it to said closed position; and means responsive to the flow of a predetermined quantity of fluid through said auxiliary fluid passage means for opening said main valve means.

5. In a valve device, the combination of: housing means having an inlet port and an outlet port and a main fluid passage connecting said ports; main valve means in said passage and adapted to be opened to permit a flow of fluid between said ports; a cylinder; a piston valve member in said cylinder; a first orifice communicating between said inlet port and said outlet port so as to provide a substantial pressure differential across said orifice, one side of said piston valve member being exposed to the fluid pressure on the low-pressure side of said orifice; a second orifice communicating between said inlet port and the other side of said piston valve member so that fluid pressure on said other side can build up to approximately the fluid pressure in said inlet port to move said piston valve member to a position in which it closes said first orifice; and means responsive to the closing of said first orifice for opening said main valve means.

6. In a valve device, the combination of: housing means having an inlet port and an outlet port and a main fluid passage connecting said ports; main valve means in said passage and adapted to be opened to permit a flow of fluid between said ports; an auxiliary fluid passage communicating between said ports; a piston valve member in said auxiliary fluid passage and movable to a closed position to close the same; means for impressing a fluid pressure differential across said piston valve member to cause it to move to said closed position, the rate of movement of said piston valve member being restricted so as to permit a substantial quantity of fluid to flow through said auxiliary passage before said piston valve member reaches said closed position; and means responsive to the closing of said piston valve member for opening said main valve means.

7. In a valve device, the combination of: housing means having an inlet port, an outlet port, and a main fluid passage connecting said ports; main valve means in said passage and adapted to be opened to permit a flow of fluid between said ports, said valve means having an auxiliary fluid passage therein communicating between said ports; an auxiliary valve member associated with said main valve means and movable relative thereto to a closed position in which it closes said auxiliary passage, said auxiliary valve member being normally maintained in open position; means for impressing a fluid pressure differential across said auxiliary valve member so as to move it to said closed position; and means responsive to the passage of a predetermined quantity of fluid through said auxiliary passage for opening said main valve means.

8. In a valve device, the combination of: housing means having an inlet port, an outlet port, and a main fluid passage connecting said ports; main valve means in said passage and adapted to be opened to permit a flow of fluid between said ports, said valve means having an auxiliary fluid passage therein communicating between said ports; an auxiliary valve member associated with said main valve means and movable relative thereto to a closed position in which it closes said auxiliary passage, said auxiliary valve member being normally maintained in open position, one end of said auxiliary valve member being exposed to the fluid pressure in said outlet port; means for admitting fluid under pressure from said inlet port to the other end of said auxiliary member for impressing a fluid pressure differential across said auxiliary valve member so as to move it to said closed position; and means for opening said main valve means.

9. In a valve device, the combination of: an outer poppet valve; an inner poppet valve concentric with said outer valve; means for normally maintaining said outer poppet valve closed and said inner poppet valve open; means for impressing a fluid pressure differential across said inner poppet valve so as to close the same; and means for opening said outer poppet valve.

10. In a valve device, the combination of: an outer poppet valve; an inner poppet valve concentric with and carried by said outer valve; spring means for yieldably retaining said inner valve in open position; a restricted orifice for gradually admitting fluid under pressure to an end of said inner valve tending to close the same against the action of said spring means; and means for opening said outer poppet valve.

11. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication; a secondary valve member in said bore and movable in response to fluid pressure in said secondary inlet port between a closed position in which it closes communication between said secondary ports and an open position in which it opens communication therebetween; means for operatively connecting said main and secondary valve members so that when said secondary valve member is moved to its said open position said main valve member is moved to its said open position; auxiliary passage means communicating between said primary ports; auxiliary valve means movable to a closed position so as to close said auxiliary passage means; and means for impressing a fluid pressure differential across said auxiliary valve means to cause it to move slowly to its said closed position, including restricted orifice means communicating with said primary inlet port and an area on one side of said auxiliary valve means, and including an area on the other side of said auxiliary valve means communicating with said primary outlet port.

12. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication; a secondary valve member in said bore and movable in response to fluid pressure in said secondary inlet port between a closed position in which it closes communication between said secondary ports and an open position in which it opens communication therebetween; means for operatively connecting said main and secondary valve members so that when said secondary valve member is moved to its said open position said main valve member is moved to its said open position; auxiliary passage means in said main valve member communicating between said primary ports; auxiliary valve means associated with said main valve member and movable to a closed position so as to close said auxiliary passage means; and means for impressing a fluid pressure differential across said auxiliary valve means to cause it to move slowly to its said closed position.

13. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication, said main valve member having an auxiliary passage therethrough communicating between said primary ports; a secondary valve member in said bore and movable in response to fluid pressure in said secondary inlet port between a closed position in which it closes communication between said secondary ports and an open position in which it opens communication therebetween; means for operatively connecting said main and secondary valve members so that when said secondary valve member is moved to its said open position said main valve member is moved to its said open position; an auxiliary valve member having one end exposed to fluid pressure in said auxiliary passage and movable to a closed position in which it closes the same; and a restricted orifice for slowly admitting fluid from said primary inlet port to the other end of said auxiliary valve member.

14. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication, said main valve member having an auxiliary metering passage therethrough communicating between said primary ports; a secondary valve member in said bore and movable in response to fluid pressure in said secondary inlet port between a closed position in which it closes communication between said secondary ports and an open position in which it opens communication therebetween; means for operatively connecting said main and secondary valve members so that when said secondary valve member is moved to its said open position said main valve member, is moved to its said open position; and an auxiliary valve means having one end extending into said metering passage and movable to a closed position in which it closes the same, and having a restricted orifice communicating between said primary inlet port and the other end of said auxiliary valve means.

15. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication, said main valve member having a chamber with a movable piston valve member therein which is adapted to seat against one end of said chamber, said one end of said chamber communicating through a metering orifice with said primary inlet port and communicating with said primary outlet port and the other end of said chamber communicating through a restricted orifice with said primary inlet port; a secondary valve member in said bore and movable in response to fluid pressure in said secondary inlet port between a closed position in which it closes communication between said secondary ports and an open position in which it opens communication therebetween; and means for operatively connecting said main and secondary valve members so that when said secondary valve member is moved to its said open position said main valve member is moved to its said open position.

16. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication; a secondary valve member in said bore and movable in response to fluid pressure in said secondary inlet port between a closed position in which it closes communication between said secondary ports and an open position in which it opens communication therebetween; means for operatively connecting said main and secondary valve members so that when said secondary valve member is moved to its said open position said main valve member is moved to its said open position; a chamber communicating at one end with said primary outlet port and at the other end through a restricted orifice with said primary inlet port, said chamber having a metering orifice in a wall thereof communicating between said primary inlet port and said one end of said chamber; and an auxiliary valve member in said chamber between said restricted orifice and said metering orifice and movable therein to a closed position in which it closes communication between said metering orifice and said primary outlet port in response to a fluid pressure differential impressed across said auxiliary valve member.

17. In a valve device, the combination of: an outer poppet valve; an inner poppet valve concentric with said outer valve; means for normally maintaining said outer poppet valve closed and said inner poppet valve open; means for hydraulically closing said inner poppet valve; and means for opening said outer poppet valve.

18. In a valve device of the character described, the combination of: housing means having a main passage and provided with an auxiliary passage in parallel with said main passage; normally closed main valve means for controlling flow of a fluid through said main passage; normally open auxiliary valve means movable to a closed position by a fluid pressure differential impressed thereacross for controlling flow of a fluid through said auxiliary passage; orifice means communicating with said main passage upstream and downstream from said main valve means for impressing such a fluid pressure differential across said auxiliary valve means; and means responsive to the flow of a predetermined quantity of fluid through said auxiliary passage for moving said main valve means to an open position.

19. In a valve device, the combination of: housing means having an inlet port and an outlet port and a main fluid passage connecting said ports; main valve means in said passage and adapted to be opened to permit a flow of fluid between said ports; a normally open auxiliary fluid passage means connecting said ports; a piston valve member in said auxiliary passage means and movable to a closed position in which it closes said auxiliary passage means; orifice means for admitting a restricted flow of fluid from said inlet port to the outer end of said piston valve member to slowly move it to said closed position; valve means for varying the flow of fluid to the outer end of said piston valve member; and means responsive to the flow of a predetermined quantity of fluid through said auxiliary passage for opening said main valve means.

20. In a valve device, the combination of: housing means having an inlet port and an outlet port and a main fluid passage connecting said ports; main valve means in said passage and adapted to be opened to permit a flow of fluid between said ports; a cylinder; a piston valve member in said cylinder; a first orifice communicating between said inlet port and said outlet port so as to provide a substantial pressure differential across said orifice, one side of said piston valve member being exposed to the fluid pressure on the low-pressure side of said orifice; a second orifice communicating between said inlet port and the other side of said piston valve member so that fluid pressure on said other side can build up to approximately the fluid pressure in said inlet port to move said piston valve member to a position in which it closes said first orifice; valve means for varying the effective area of said second orifice; and means responsive to the flow of a predetermined quantity of fluid through said first orifice for opening said main valve means.

21. In a valve device, the combination of: a housing having a longitudinal bore, and having a primary inlet port and a primary outlet port communicating with said bore, and having a secondary inlet port and a secondary outlet port communicating with said bore; a main valve member in said bore movable between an open position in which it provides communication between said primary ports and a closed position in which it closes such communication; a secondary valve member in said bore and movable in response to fluid pressure in said secondary inlet port between a closed position in which it closes communication between said secondary ports and an open position in which it opens communication therebetween; means for operatively connecting said main and secondary valve members so that when said secondary valve member is moved to its said open position said main valve member is moved to its said open position; auxiliary passage means communicating between said primary ports; auxiliary valve means movable to a closed position so as to close said auxiliary passage means; orifice means communicating between said primary ports and communicating with opposite sides of said auxiliary valve means for impressing a fluid pressure differential across said auxiliary valve means to cause it to move slowly to its said closed position; and valve means for varying said fluid pressure differential.

22. A valve device as set forth in claim 16 including valve means for varying the effective area of said restricted orifice.

23. In a valve device, the combination of: a main passage having therein a main valve which is movable between open and closed positions; spring means engaging said main valve and biasing it toward its closed position; an auxiliary passage in parallel with said main valve and communicating with said main passage upstream and downstream from said main valve; a flow metering device, including an auxiliary valve in said auxiliary passage and movable between open and closed positions, for metering a predetermined quantity of fluid through said auxiliary passage, said auxiliary valve being biased toward its open position by spring means in engagement therewith, said flow metering device including means for moving said auxiliary valve to its closed position after said predetermined quantity of fluid has been metered; and means responsive to the metering of said predetermined quantity of fluid for opening said main valve.

24. In a valve device, the combination of: housing means having an inlet port and an outlet port and a main fluid passage connecting said ports; main valve means in said main passage and movable between open and closed positions; spring means engaging said main valve means and biasing it toward its closed position; auxiliary fluid passage means connecting said ports; auxiliary valve means in said auxiliary passage means and movable between open and closed positions; spring means engaging said auxiliary valve means and biasing it toward its open position to permit flow of fluid through said auxiliary passage means; means including a restricted orifice communicating with said inlet port for applying to said auxiliary valve means a fluid pressure biasing said auxiliary valve means toward its closed position, whereby to automatically close said auxiliary valve means after a predetermined quantity of fluid has been metered through said auxiliary passage means; and means responsive to the metering of said predetermined quantity of fluid through said auxiliary passage means for opening said main valve.

CASIMER A. RATKOVIAK.

REFERENCES CITED

The following references are of record in the file of this patent:

UNITED STATES PATENTS

| Number | Name | Date |
| --- | --- | --- |
| 2,405,172 | Yanchenko | Aug. 6, 1946 |
| 2,423,920 | Yanchenko | July 15, 1947 |
| 2,428,150 | Field | Sept. 30, 1947 |

FOREIGN PATENTS

| Number | Country | Date |
| --- | --- | --- |
| 56,048 | Germany | of 1891 |

OTHER REFERENCES

Aviation Magazine, pages 144 and 145, November 1944.